(12) United States Patent
Lee et al.

(10) Patent No.: US 7,746,754 B2
(45) Date of Patent: Jun. 29, 2010

(54) METHOD OF ALLOCATING AREAS IN OPTICAL DISC, DATA RECORDING AND/OR REPRODUCING APPARATUS ADOPTING THE SAME, AND OPTICAL DISC THEREFOR

(75) Inventors: Kyung-geun Lee, Seongnam-si (KR); Wook-yeon Hwang, Yangpyung-gun (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1069 days.

(21) Appl. No.: 11/070,286

(22) Filed: Mar. 3, 2005

(65) Prior Publication Data

US 2005/0276187 A1    Dec. 15, 2005

(30) Foreign Application Priority Data

Jun. 14, 2004  (KR) ............... 10-2004-0043657
Jun. 17, 2004  (KR) ............... 10-2004-0045050
Sep. 20, 2004  (KR) ............... 10-2004-0075058

(51) Int. Cl.
*G11B 7/24*   (2006.01)

(52) U.S. Cl. ............... 369/275.1; 369/272.1
(58) Field of Classification Search ............... None
See application file for complete search history.

(56) References Cited

U.S. PATENT DOCUMENTS

| 6,072,759 | A | | 6/2000 | Maeda et al. | |
| 6,128,717 | A | * | 10/2000 | Harrison et al. | ............ 711/202 |
| 2002/0150013 | A1 | | 10/2002 | Hsiao | |
| 2003/0137909 | A1 | * | 7/2003 | Ito et al. | ............ 369/47.14 |
| 2003/0227846 | A1 | | 12/2003 | Lee et al. | |
| 2004/0120241 | A1 | * | 6/2004 | Kobayashi et al. | ............ 369/94 |
| 2004/0264322 | A1 | | 12/2004 | Shishido et al. | |

(Continued)

FOREIGN PATENT DOCUMENTS

EP     0 715 301 A2    6/1996

(Continued)

OTHER PUBLICATIONS

Office Action issued in Korean Pat. App. No. 2004-75058 on Feb. 20, 2006.

(Continued)

*Primary Examiner*—Joseph H Feild
*Assistant Examiner*—Henok G Heyi
(74) *Attorney, Agent, or Firm*—NSIP Law

(57) ABSTRACT

Recording areas in an optical disc having a plurality of recording layers allocated so each recording layer includes a data area for recording data, a connection area in which a predetermined pattern of data for indicating that no data area is recorded therein, and a remaining area, wherein a size and location of the data area of each recording layer is determined according to an amount of user data to be recorded. The connection area and the remaining area are allocated next to the data area of each recording layer in a direction from the inner circumference to the outer circumference of the disc. Accordingly, a recording time is reducible, and exclusive areas for recording information except user data can be additionally allocated to outer circumference areas of the optical disc or the sizes of the exclusive areas can be increased, increasing recording medium efficiency.

17 Claims, 6 Drawing Sheets

U.S. PATENT DOCUMENTS

2005/0030795 A1* 2/2005 Matsuba ................ 365/189.01
2005/0030873 A1* 2/2005 Sasaki ..................... 369/59.25
2005/0078577 A1* 4/2005 Horie ...................... 369/47.28

FOREIGN PATENT DOCUMENTS

| EP | 1 244 096 A2 | 9/2002 |
| EP | 1 329 888 A1 | 7/2003 |
| EP | 1 669 985 A1 | 6/2006 |
| JP | 10-21673 | 1/1998 |
| JP | 2003-323769 | 11/2003 |
| JP | 2004-362726 | 12/2004 |
| WO | 2004/086374 A1 | 10/2004 |
| WO | WO 2005/004119 | 1/2005 |

OTHER PUBLICATIONS

Search Report and Written Opinion issued in International Patent Application No. PCT/KR2005/001795 on Sep. 8, 2005.

"Double Layer DVD=R Multi-Media Command Set Description, Version 1.00" Internet Citation, [Online] Jun. 4, 2004, XP002386267; Retrieved from the Internet: Jun. 20, 2006.

Woerlee, Pierre H. et al. "Format of an 8.5-GB double-layer DVD recordable disc", 2004, vol. 5380, No. 1, Sep. 2004, pp. 15-20, XP002482005, Bellingham, WA.

European Search Report issued in European Patent Application No. 05764972.5 on Jul. 21, 2008.

Taiwan First Office Action issued on Dec. 18, 2009, in corresponding Taiwan Application No. 94116841 (11 pages).

* cited by examiner

FIG. 1A (PRIOR ART)

| INNER ZONE | | DESCRIPTION | PURPOSE |
|---|---|---|---|
| LEAD-IN | PRE-RECORDED ZONE | CONTROL DATA ZONE | DISC-RELATED INFORMATION & COPY PROTECTION INFORMATION |
| | REWRITABLE AREA | BUFFER | ... |
| | | RESERVED | FUTURE EXTENSION |
| | | TEST ZONE | OPTIMUM POWER TEST ZONE |
| | | INFORMATION ZONE | INFORMATION RELATED TO RECORDING/REPRODUCING APPARATUS OR DISC STATUS |
| USER DATA AREA | | | |
| LEAD-OUT | | | − |

FIG. 1B (PRIOR ART)

| INNER ZONE | | DESCRIPTION | PURPOSE |
|---|---|---|---|
| LEAD-IN | PRE-RECORDED ZONE | CONTROL DATA ZONE | DISC-RELATED INFORMATION & COPY PROTECTION INFORMATION |
| | READ ONLY AREA | BUFFER | ... |
| | | RESERVED | ... |
| USER DATA AREA | | | |
| LEAD-OUT | | | − |

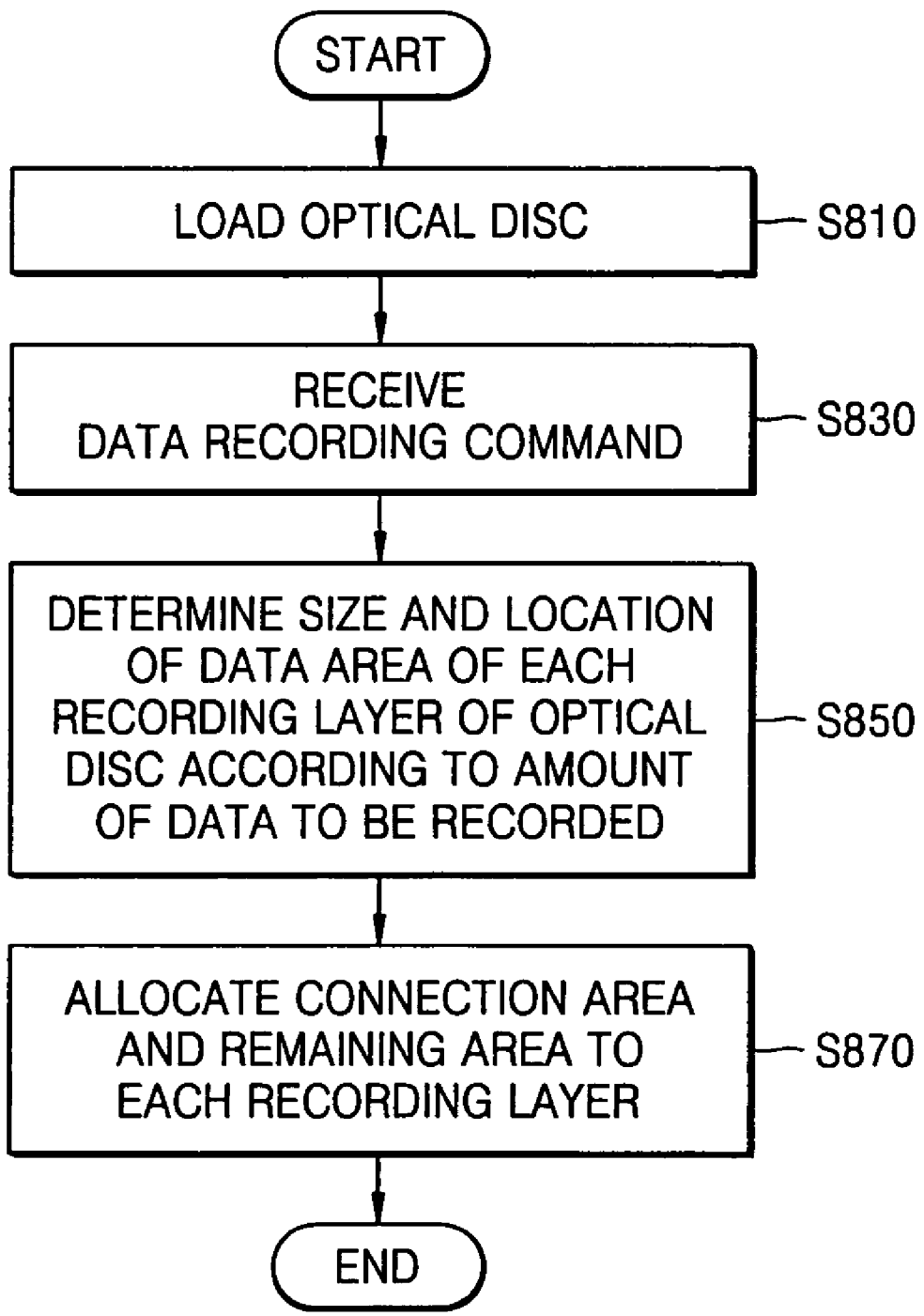

METHOD OF ALLOCATING AREAS IN OPTICAL DISC, DATA RECORDING AND/OR REPRODUCING APPARATUS ADOPTING THE SAME, AND OPTICAL DISC THEREFOR

This application claims the priority of Korean Patent Application Nos. 2004-43657 filed on Jun. 14, 2004, 2004-45050 filed on Jun. 17, 2004, and 2004-75058 filed on Sep. 20, 2004 in the Korean Intellectual Property Office, the disclosures of which are incorporated herein by reference.

BACKGROUND OF THE INVENTION

1. Field of the Invention

The present invention relates to an optical disc, and more particularly, to a method of allocating areas in an optical disc, a data recording and/or reproducing apparatus adopting the same, and an optical disc therefor.

2. Description of the Related Art

In general, optical discs are classified into compact discs (CDs) and digital versatile discs (DVDs) according to a recording capacity. Kinds of optical discs, on which data can be recorded, erased from and reproduced from, include 650 MB CD-R, 650 MB CD-RW, 4.7 GB DVD+R/RW, 4.7 GB DVD-RAM, and DVD-R/RW optical discs. Kinds of read-only optical discs include 650 MB CD and 4.7 GB DVD-ROM discs. Furthermore, a next generation DVD having a recording capacity of over 15 GB is under development.

In a case of a conventional recordable DVD, there are only 4.7 GB single layer discs. However, in a case of a DVD-ROM, there are already 8.5 GB dual layer discs. In order to backup these 8.5 GB discs, an 8.5 GB recordable DVD is required. However, in this case, since a recording time basically doubles, it can be a disadvantage for a user. A method of improving the recording speed would be desirable. However, since improvement of disc technology must precede such an improved method, a method of effectively recording data at a conventional speed is required to immediately introduce the 8.5 GB recordable DVD to the market.

FIG. 1A illustrates a structure of a conventional rewritable optical disc. FIG. 1B illustrates a structure of a conventional read-only optical disc. A structure of a lead-out area of the rewritable optical disc shown in FIG. 1A is almost the same as a structure of a lead-in area. In particular, the lead-in area of the rewritable optical disc shown in FIG. 1A includes a test area used to determine an optimal recording power.

FIGS. 2A and 2B illustrate structures of dual recording layer discs on which data is recorded in a disc-at-once mode. The disc-at-once mode is a recording mode in which data is recorded on a disc at once (i.e., in a single recording session) and a predetermined pattern of data is recorded on an empty data area, in which data is not recorded, so as not to record additional data on the disc even if the empty data area remains. In general, the disc-at-once mode is used to produce backups of bulk data by recording the bulk data on write-once discs.

On a dual recording layer optical disc 10 shown in FIG. 2A, data is recorded in an opposite track pass (OTP) direction, and on an optical disc 20 shown in FIG. 2B, data is recorded in a parallel track pass (PTP) direction.

Referring to FIG. 2A, when data is recorded on the dual recording layer optical disc 10 in the disc-at-once mode in the OTP direction according to conventional technology, user data is recorded in a data area 12 of a recording layer L1 from which layer the data is firstly reproduced, and remaining user data is recorded in a data area 15 of a recording layer L2. Areas 13 and 14 located outside an outer boundary 19 of the data areas 12 and 15 are fully occupied with a predetermined pattern of data for indicating no data areas. The predetermined pattern of data, for example, is data having a lead-out attribute. An area occupied with the predetermined pattern of data for indicating the no data area is commonly called a connection area to discriminate from a lead-in area 11 and a lead-out area 17.

An empty area 16, in which the user data is not recorded, of an entire data area of the recording layer L2 becomes the connection area by being occupied with the predetermined pattern of data for indicating the no data area.

The optical disc 20 shown in FIG. 2B includes a lead-in area 21, a data area 22 of a recording layer L1, a lead-out area 24, a data area 25 of a recording layer L2, and connection areas 23 and 26 of the recording layers L1 and L2.

Recording methods illustrated in FIGS. 2A and 2B are applicable to read-only discs and rewritable discs in the same way.

In the methods of recording data on an optical disc in the disc-at-once mode according to the conventional technology described above, an additional data recording time is required to record the predetermined pattern of data having the lead-out attribute in the area on which the user data is not recorded. Furthermore, since the areas outside the data areas are not used at all, optical discs are not efficiently used.

SUMMARY OF THE INVENTION

The present invention provides a method of allocating areas in an optical disc, which enables reduction of time required to record data and relatively efficient use of the optical disc when an amount of data to be recorded is known in advance, a data recording and/or reproducing apparatus adopting the same, and an optical disc therefor.

According to an aspect of the present invention, there is provided an optical disc having a plurality of recording layers, each recording layer comprising in a direction from an inner circumference to an outer circumference of the optical disc: a user data area for recording data therein; a connection area in which a predetermined pattern of data for indicating that no user data is recorded therein; and a remaining area, wherein a size and a location of the user data area of each recording layer is determined according to an amount of user data to be recorded, and the connection area and the remaining area are allocated next to the user data area of each recording layer in the direction from the inner circumference to the outer circumference.

According to another aspect of the present invention, there is provided a data recording and/or reproducing apparatus comprising: a write/read unit writing and/or reading data on or from an optical disc having a plurality of recording layers; and a controller determining a size and a location of a user data area of each recording layer according to an amount of user data to be recorded and allocating a connection area and a remaining area next to the user data area of each recording layer in a direction from an inner circumference to an outer circumference of the optical disc, wherein the connection area is an area for recording a predetermined pattern of data for indicating that no user data is recorded therein.

According to another aspect of the present invention, there is provided a method of allocating areas in an optical disc having a plurality of recording layers, the method comprising: determining a size and a location of a user data area of each recording layer according to an amount of user data to be recorded; and allocating a connection area and a remaining area next to the user data area of each recording layer in a direction from an inner circumference to an outer circumference of the optical disc, wherein the connection area is an area for recording a predetermined pattern of data for indicating that no user data is recorded therein.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1A illustrates a structure of a conventional rewritable optical disc;

FIG. 1B illustrates a structure of a conventional read-only optical disc;

FIG. 8 is a flowchart illustrating a method of allocating areas in an optical disc according to an embodiment of the present invention.

DETAILED DESCRIPTION OF THE INVENTION

Figure 2A:
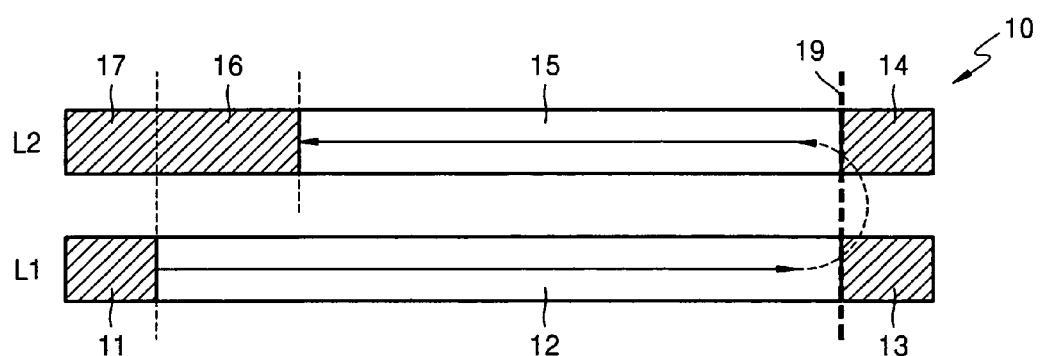
FIGS. 2A and 2B illustrate structures of conventional dual recording layer discs on which data is recorded in a disc-at-once mode.
Figure 2B:
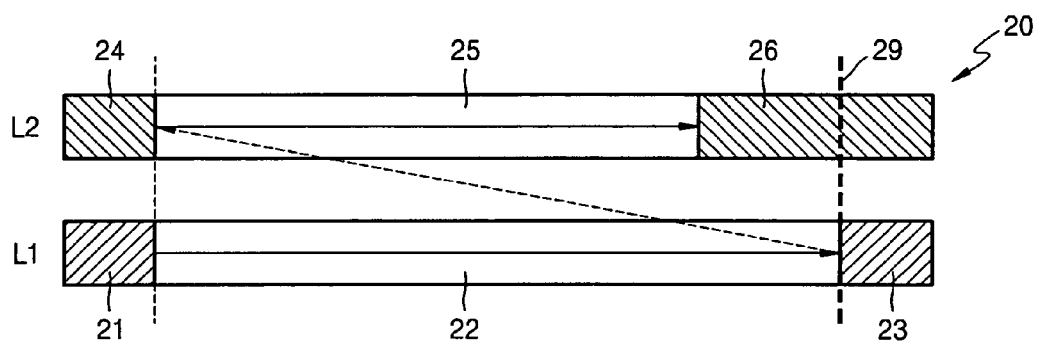

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In embodiments of the present invention, cases where data is recorded on an optical disc having a plurality of recording layers in a disc-at-once mode will be described as examples. In the embodiments, a size of a user data area of each recording layer is determined so that a same amount of user data is recorded on each of the plurality of recording layers in a case where a total amount of the user data to be recorded is known in advance and is less than a total recordable amount of the optical disc when the user data is recorded on the optical disc having the plurality of recording layers in the disc-at-once mode. When the size of the user data area of each recording layer is determined, the location of the user data area of each recording layer is determined. When the location of the user data area of each recording layer is determined, the locations and/or sizes of a connection area and a remaining area of each recording layer are determined. Therefore, according to the embodiments of the present invention, since a predetermined pattern of data having a lead-out attribute does not have to be recorded in an entire residual data area in which data has not been recorded, a data recording time is reduced as compared with a conventional data recording time.

The connection area is an area for recording a predetermined pattern of data for indicating that no data is recorded therein. The predetermined pattern of data, for example, is data having the lead-out attribute.

According to embodiments of the present invention, an exclusive area is allocated to an outer circumference area remaining by excluding the user data area and the connection area. The exclusive area is used for a special purpose by a data recording and/or reproducing apparatus. For example, a test area for an optimum power control (OPC) can be allocated to the exclusive area. Another area except the test area can be allocated to the exclusive area, and the exclusive area can be designated as a reserved area. The OPC is used to determine an optimum recording power in the data recording and/or reproducing apparatus through a pre-test before user data is recorded on a rewritable optical disc.

Figure 3A:
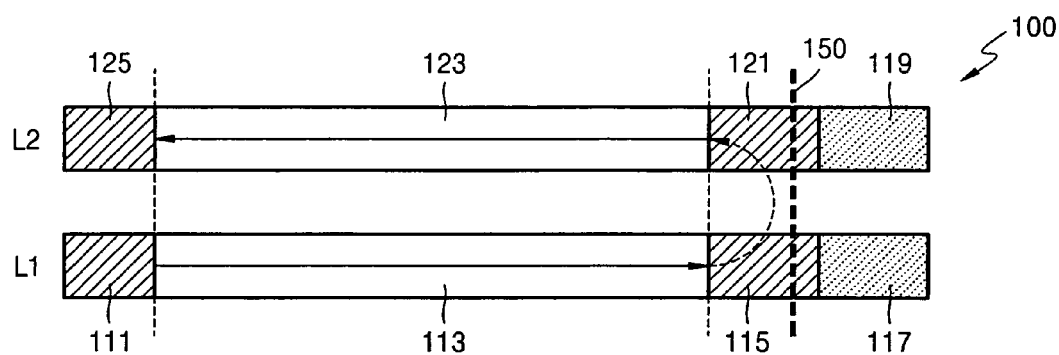
FIGS. 3A and 3B illustrate structures of optical discs according to a first embodiment of the present invention.
Figure 3B:
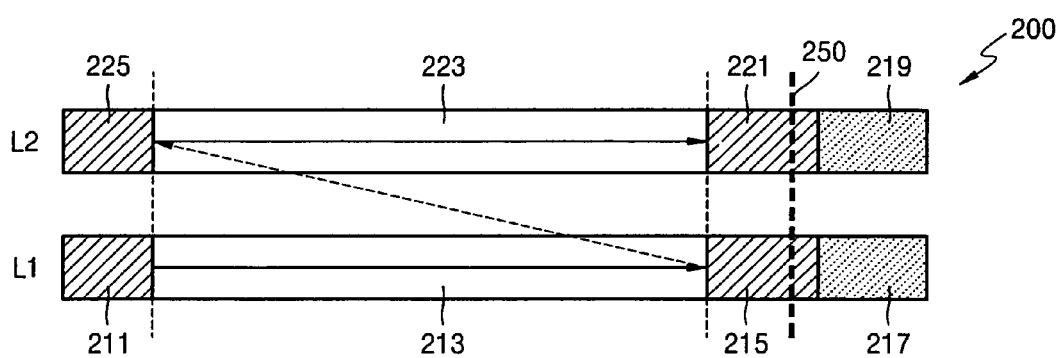

FIGS. 3A and 3B illustrate structures of optical discs having a dual recording layers on which data is recorded in the disc-at-once mode according to a first embodiment of the present invention. On an optical disc 100 illustrated in FIG. 3A, data is recorded in an opposite track pass (OTP) direction, and on an optical disc 200 illustrated in FIG. 3B, data is recorded in a parallel track pass (PTP) direction.

Referring to FIG. 3A, when data is recorded on the dual recording layer disc 100 in the disc-at-once mode in the OTP direction, a data recording and/or reproducing apparatus can recognize an amount of user data to be recorded, and if the amount of the user data is less than a total recordable amount of the optical disc 100, the sizes of user data areas 113 and 123 of recording layers L1 and L2 are determined so that a same amount of the user data can be recorded on each of the recording layers L1 and L2. Since inner boundaries of the user data areas 113 and 123 have been determined, when the sizes of user data areas 113 and 123 are determined, outer boundaries of the user data areas 113 and 123 are automatically determined.

When locations of the user data areas 113 and 123 are determined, the sizes and/or locations of connection areas 115 and 121 and remaining areas 117 and 119 are determined in the outer circumference direction of each recording layer. The sizes and/or locations of the connection areas 115 and 121 and the remaining areas 117 and 119 can be determined in various ways. For example, if the size of at least one of the connection areas 115 and 121 or the remaining areas 117 and 119 is predetermined, all of the connection areas 115 and 121 and the remaining areas 117 and 119 can be determined.

The remaining areas 117 and 119 of the optical disc 100 are used as exclusive areas for a predetermined purpose. In embodiments hereinafter, the exclusive areas are used as test areas for the OPC. However, the exclusive area is not limited to the test area. In the optical disc 100 shown in FIG. 3A, a reference number 111 denotes a lead-in area, a reference number 125 denotes a lead-out area, and a reference number 150 denotes an outer boundary of original data areas.

The optical disc 200 shown in FIG. 3B is different from the optical disc 100 shown in FIG. 3A only in that a data recording direction is the PTP.

In the embodiments illustrated in FIGS. 3A and 3B, the sizes of the user data areas 113 and 123 of the recording layers are reduced according to the amount of the user data to be recorded, and the sizes of the test areas 117 and 119 allocated to outer circumference areas of the recording layers are increased in proportion to decrease of the sizes of the user data areas 113 and 123 of the recording layers. Also, since a predetermined pattern of data does not have to be recorded in residual data areas in which the user data has not been recorded, a data recording time is reduced as compared with a conventional data recording time. Also, optical discs can be more efficiently used by allocating the exclusive areas, such as the test areas, outside the connection areas.

Figure 4:
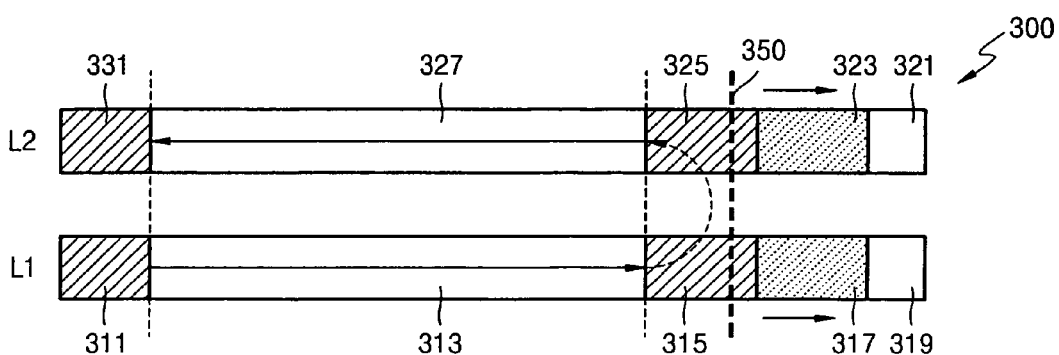
FIG. 4 illustrates a structure of an optical disc according to a second embodiment of the present invention.

FIG. 4 illustrates a structure of an optical disc 300 according to a second embodiment of the present invention. Data is recorded on the optical disc 300 shown in FIG. 4 in the disc-at-once mode in the OTP direction.

The optical disc 300 includes a lead-in area 311, a data area 313 of a recording layer L1, a connection area 315 of the recording layer L1, a test area 317 of the recording layer L1, a non-recording area 319 of the recording layer L1, a non-recording area 321 of the recording layer L2, a test area 323 of the recording layer L2, a connection area 325 of the recording layer L2, a data area 327 of a recording layer L2, and a lead-out area 331. A reference number 350 denotes an outer boundary of original data areas.

Unlike the optical disc 100 shown in FIG. 3A, in the optical disc 300 shown in FIG. 4, the non-recording areas 319 and 321 in which no data is recorded are allocated to outermost circumferences of the recording layers L1 and L2.

Also, when a using direction of the test areas 317 and 323 allocated on the optical disc 300 shown in FIG. 4 is from an inner circumference to an outer circumference, outer boundaries of the test areas 317 and 323 can be re-determined by a data recording and/or reproducing apparatus. That is, when expansion of the test areas 317 and 323 is necessary, end positions of the test areas 317 and 323 can be re-determined by the data recording and/or reproducing apparatus based on selection of a host or a user. Here, information of the re-determined locations of the test areas 317 and 323 must be recorded in a predetermined area of the optical disc 300, e.g., the lead-in area 311.

In the optical disc 300 shown in FIG. 4, a case where the data recording direction is the OTP is described as an example. However, a case of the PTP also can be equally applied to the optical disc 300.

Figure 5:
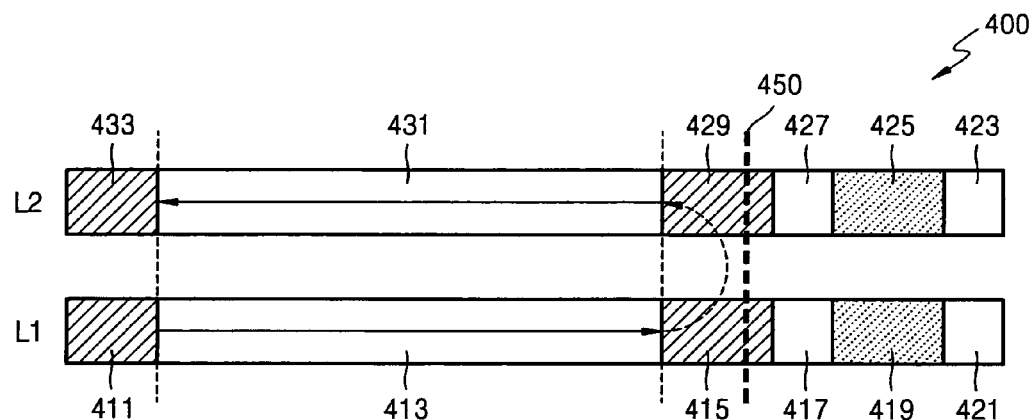
FIG. 5 illustrates a structure of an optical disc according to a third embodiment of the present invention.

FIG. 5 illustrates a structure of an optical disc 400 according to a third embodiment of the present invention. Data is recorded on the optical disc 400 shown in FIG. 5 in the disc-at-once mode in the OTP direction.

The optical disc 400 includes a lead-in area 411, a data area 413 of a recording layer L1, a connection area 415 of the recording layer L1, a reserved area 417 of the recording layer L1, a test area 419 of the recording layer L1, a non-recording area 421 of the recording layer L1, a non-recording area 423 of the recording layer L2, a test area 425 of the recording layer L2, a reserved area 427 of the recording layer L2, a connection area 429 of the recording layer L2, a data area 431 of a recording layer L2, and a lead-out area 433. A reference number 450 denotes an outer boundary of original data areas.

Unlike the optical disc 300 shown in FIG. 4, in the optical disc 400 shown in FIG. 5, the reserved area 417 of the recording layer L1 and the reserved area 427 of the recording layer L2 are allocated. The reserved areas 417 and 427 are reserved for a future use. However areas having a predetermined purpose can be allocated instead of the reserved areas 417 and 427.

In the present embodiment, locations of the test area 419 of the recording layer L1 and the test area 425 of the recording layer L2 are fixed. Therefore, information of the locations of the test area 419 of the recording layer L1 and the test area 425 of the recording layer L2 does not have to be recorded on the optical disc 400. However, if the locations of the test area 419 of the recording layer L1 and the test area 425 of the recording layer L2 are determined by a data recording and/or reproducing apparatus or a host, the information of the locations of the test area 419 of the recording layer L1 and the test area 425 of the recording layer L2 must be recorded on the optical disc 400.

Also, when a using direction of the test areas 419 and 425 allocated on the optical disc 400 shown in FIG. 5 is from an inner circumference to an outer circumference, outer boundaries of the test areas 419 and 425 can be re-determined by the data recording and/or reproducing apparatus. That is, when expansion of the test areas 419 and 425 is necessary, end positions of the test areas 419 and 425 can be re-determined by the data recording and/or reproducing apparatus based on selection of the host or a user. Here, information of the re-determined locations of the test areas 419 and 425 must be recorded in a predetermined area of the optical disc 400, e.g., the lead-in area 411.

In the optical disc 400 shown in FIG. 5, a case where the data recording direction is the OTP is described as an example. However, a case of the PTP also can be equally applied to the optical disc 400.

As described above, the optical discs having the dual recording layers have been described. However, the present invention is not limited to the optical discs having the dual recording layers and can be equally applied to optical discs having more than two recording layers.

Figure 6A:
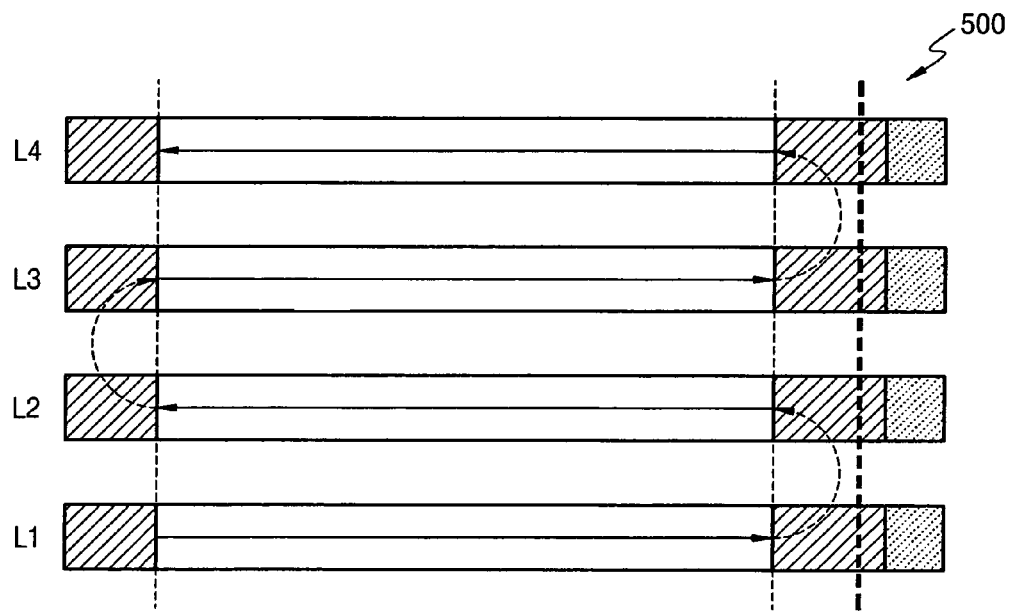
FIGS. 6A and 6B illustrate structures of optical discs having 4 recording layers according to a fourth embodiment of the present invention.
Figure 6B:
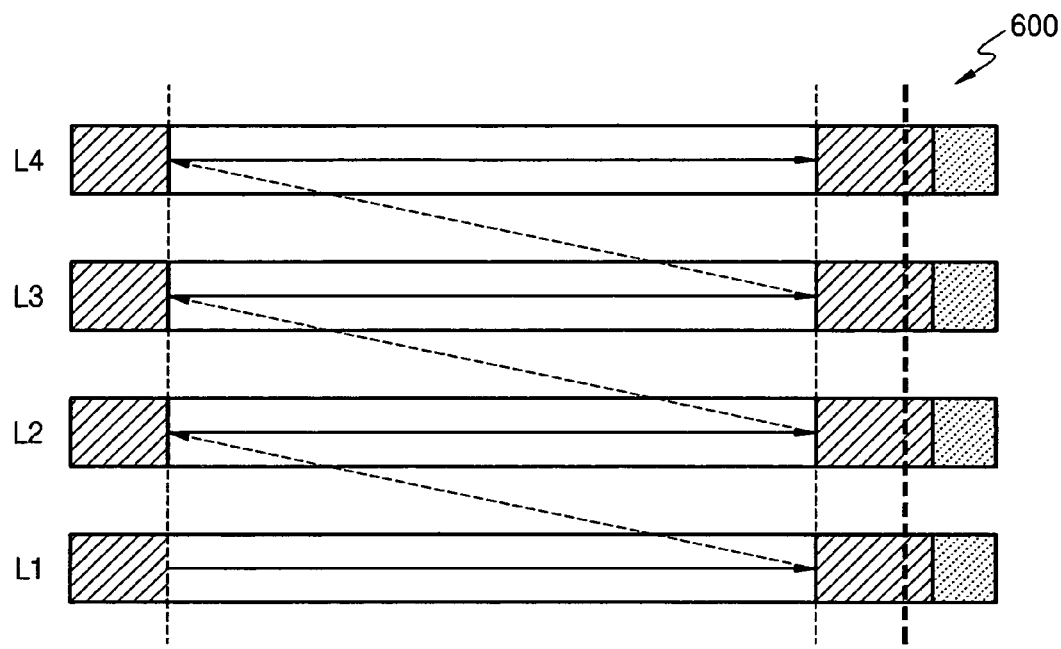

FIGS. 6A and 6B illustrate structures of optical discs having 4 recording layers according to a fourth embodiment of the present invention. FIG. 6A illustrates a structure of an optical disc 500 having the 4 recording layers, on which data is recorded according to the data recording method and the area allocating method described with reference to FIG. 3A. FIG. 6B illustrates a structure of an optical disc 600 having the 4 recording layers, on which data is recorded according to the data recording method and the area allocating method described with reference to FIG. 3B.

The data recording methods and the area allocating methods described with reference to FIGS. 4 and 5 also can be applied to optical discs having more than two recording layers.

The test areas allocated to the optical discs according to the embodiments of the present invention described above are preferably used in a direction from an inner circumference to an outer circumference without respect to which recording layer the test area is located in since recording characteristics of outer circumference parts of optical discs are commonly not good and since areas close to the user data areas have less differences in terms of the recording characteristics.

The exclusive areas according to the embodiments of the present invention can be used as the test areas for the OPC and areas for recording information related to a record before user data is recorded by a data recording and/or reproducing apparatus. For example, information including when a record is performed by which data recording and/or reproducing apparatus can be recorded in the exclusive areas.

Figure 7:
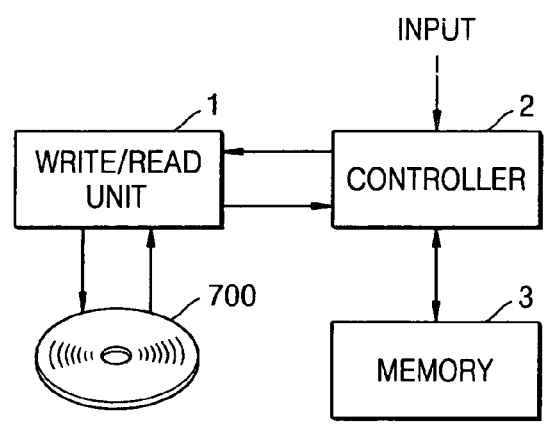
FIG. 7 is a block diagram of a data recording and/or reproducing apparatus according to an embodiment of the present invention.

FIG. 7 is a block diagram of a data recording and/or reproducing apparatus according to an embodiment of the present invention. Referring to FIG. 7, the apparatus includes a write/read unit 1, a controller 2, and a memory 3. An optical disc 700 has one of the structures described above in FIGS. 3A through 6B.

The write/read unit 1 records data on the optical disc 700 and/or reads the recorded data according to a control of the controller 2. User data to be recorded on the optical disc 700, various kinds of control information generated by the controller 2, and data read from the optical disc 700 are temporarily stored in the memory 3 according to controls of the controller 2.

The controller 2 determines the size and/or location of each area of the optical disc 700 as described above and allocates the determined size and/or location to the optical disc 100.

An area allocating method will now be described on the basis of the structure of the data recording and/or reproducing apparatus shown in FIG. 7.

FIG. 8 is a flowchart illustrating a method of allocating areas in an optical disc according to an embodiment of the present invention. After an optical disc according to an embodiment of the present invention is loaded in the data recording and/or reproducing apparatus in operation S810, the data recording and/or reproducing apparatus receives a data recording command from a host (not shown) in operation S830. A data recording mode according the embodiment shown in FIG. 8 is the disc-at-once mode. Information of an amount of user data to be recorded is input to the controller 2 from the host along with the data recording command.

The controller 2 determines the size and/or location of a user data area of each recording layer of the optical disc 700 according to the amount of the data to be recorded in operation S850. The controller 2 determines the size of the user data area of each recording layer so that the same amount of user data is recorded in each recording layer when the amount of the user data to be recorded is less than a total recordable amount of the optical disc 700.

After the controller 2 determines the size and/or location of the user data area of each recording layer of the optical disc 700 according to the amount of the data to be recorded, the controller 2 allocates a connection area and a remaining area of each recording layer next to the data area of each recording layer in a direction from an inner circumference to an outer circumference in operation S870. Since an inner boundary of each data area has been determined, when the size of the user data area of each recording layer is determined, an outer boundary of each data area is automatically determined. When a location of the user data area of each recording layer is determined, the sizes and/or locations of a plurality of connection areas and remaining areas are determined in the outer circumference direction of each recording layer. The sizes and/or locations of the plurality of connection areas and remaining areas can be determined in various ways. For example, if the size of at least one of the connection areas or the remaining areas is predetermined, all of the connection areas and the remaining areas can be determined. As described above, a remaining area can include at least one of a test area, a non-recording area, or a reserved area.

Structures of optical discs to which areas are allocated according to the method of allocating areas in an optical disc according to the embodiment of the present invention shown in FIG. 8 and on which data is recorded have been described above with FIGS. 3A through 6B.

The present invention may be embodied in a general-purpose computer by running a program from a computer readable medium, including but not limited to storage media such as magnetic storage media (ROMs, RAMs, floppy disks, magnetic tapes, etc.), optically readable media (CD-ROMs, DVDs, etc.), and carrier waves (transmission over the internet). The present invention may be embodied as a computer readable medium having a computer readable program code unit embodied therein for causing a number of computer systems connected via a network to effect distributed processing.

As described above, according to embodiments of the present invention, when data is recorded on an optical disc having a plurality of recording layers, a recording time is reduced, and exclusive areas for recording information except user data may be additionally allocated to outer circumference areas of the optical disc or the sizes of the exclusive areas may be increased. Accordingly, recording medium efficiency is increased.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical disc having a plurality of recording layers, each recording layer comprising:
    a user data area for recording user data therein;
    a connection area in which a predetermined pattern of data for indicating that no user data is recorded therein is recorded; and
    a remaining area comprising an exclusive area for a predetermined purpose,
    wherein:
        a size and location of the user data area of each recording layer is determined according to an amount of user data to be recorded,
        the connection area and the remaining area are allocated next to the user data area of each recording layer in a direction from an inner circumference to an outer circumference of the optical disc,
        a size of the connection area and the remaining area is determined according to a size of the user data area, and
    an equal amount of user data is recorded in each recording layer when the amount of the user data to be recorded is less than the total recordable amount of the optical disc.

2. The optical disc of claim 1, wherein the exclusive area is a test area used for obtaining an optimum recording condition.

3. The optical disc of claim 1, wherein at least one of a beginning position or an ending position of the exclusive area varies.

4. The optical disc of claim 1, wherein information indicating that the exclusive area has been allocated is recorded in a predetermined area.

5. The optical disc of claim 1, wherein the exclusive area is used in a direction from the inner circumference of the optical disc to the outer circumference of the optical disc.

6. A data recording and/or reproducing apparatus comprising:
    a write/read unit writing or reading data on or from an optical disc having a plurality of recording layers; and
    a controller determining a size and a location of a user data area of each recording layer according to an amount of user data to be recorded and allocating a connection area and a remaining area comprising an exclusive area for a predetermined purpose, next to the user data area of each recording layer in a direction from an inner circumference of the optical disc to an outer circumference of the optical disc,
    wherein the connection area is an area for recording a predetermined pattern of data for indicating that no user data is recorded therein,
    wherein a size of the connection area and the remaining area is determined according to a size of the user data area, and
    wherein the controller allocates the size of the user data area of each recording layer so that an equal amount of user data is recorded in each recording layer when the amount of the user data to be recorded is less than the total recordable amount of the optical disc.

7. The apparatus of claim 6, wherein the controller allocates an exclusive area for a predetermined purpose to the remaining area.

8. The apparatus of claim 7, wherein the controller controls the write/read unit to record location information of the exclusive area in a predetermined area of the optical disc.

9. The apparatus of claim 7, wherein the exclusive area is a test area used for obtaining an optimum recording condition.

10. The apparatus of claim 7, wherein the controller controls the write/read unit to use the exclusive area in a direction from the inner circumference of the optical disc to the outer circumference of the optical disc.

11. The apparatus of claim 7, wherein the controller:
re-determines an ending position of the exclusive area; and
controls the write/read unit to record location information of the re-determined exclusive area in a predetermined area of the optical disc.

12. A method of allocating areas in an optical disc having a plurality of recording layers, the method comprising:
determining a size and a location of a user data area of each recording layer according to an amount of user data to be recorded; and
allocating a connection area and a remaining area comprising an exclusive area for a predetermined purpose, next to the user data area of each recording layer in a direction from an inner circumference of the optical disc to an outer circumference of the optical disc,
wherein the connection area is an area for recording a predetermined pattern of data for indicating that no user data is recorded therein,
wherein a size of the connection area and the remaining area is determined according to a size of the user data area, and
wherein allocating an equal amount of user data in each recording layer when the amount of the user data to be recorded is less than the total recordable amount of the optical disc.

13. The method of claim 12, further comprising:
allocating an exclusive area for a predetermined purpose to the remaining area.

14. The method of claim 13, further comprising:
recording location information of the exclusive area in a predetermined area of the optical disc.

15. The method of claim 13, wherein the exclusive area is a test area used for obtaining an optimum recording condition.

16. The method of claim 13, further comprising:
re-determining an ending position of the exclusive area; and
recording location information of the re-determined exclusive area in a predetermined area of the optical disc.

17. A non-transitory computer readable medium having recorded thereon a computer readable program for performing a method of allocating areas in an optical disc having a plurality of recording layers, the method comprising:
determining a size and a location of a user data area of each recording layer according to an amount of user data to be recorded; and
allocating a connection area and a remaining area comprising an exclusive area for a predetermined purpose, next to the data area of each recording layer in a direction from an inner circumference of the optical disc to an outer circumference of the optical disc,
wherein the connection area is an area for recording a predetermined pattern of data for indicating that no user data is recorded therein, a size of the connection area and the remaining area is determined according to a size of the user data area, and
wherein allocating an equal amount of user data in each recording layer when the amount of the user data to be recorded is less than the total recordable amount of the optical disc.

* * * * *